United States Patent [19]

Kaneko et al.

[11] Patent Number: 5,636,296
[45] Date of Patent: Jun. 3, 1997

[54] IMAGE ANALYSIS SYSTEM

[75] Inventors: Masahide Kaneko; Atsushi Koike, both of Tokyo; Yoshinori Hatori, Kanagawa, all of Japan

[73] Assignee: Kokusai Denshin Denwa Co., Ltd., Tokyo, Japan

[21] Appl. No.: 238,335

[22] Filed: May 4, 1994

Related U.S. Application Data

[63] Continuation of Ser. No. 21,137, Feb. 23, 1993, abandoned.

[30] Foreign Application Priority Data

Mar. 11, 1992 [JP] Japan ................. 4-086563

[51] Int. Cl.⁶ .............. H04N 5/268; G06K 9/26; G01N 21/88
[52] U.S. Cl. .............. 382/276; 382/307; 364/131; 364/140; 364/180
[58] Field of Search .............. 375/107; 382/41, 382/49, 61, 9; 358/105, 21 R, 160, 142, 146, 147, 311; 364/131, 133, 137, 138, 140, 141

[56] References Cited

U.S. PATENT DOCUMENTS

| | | | |
|---|---|---|---|
| 3,859,458 | 1/1975 | Takezawa et al. | 358/147 |
| 4,308,558 | 12/1981 | Hernandez et al. | 358/142 |
| 4,817,175 | 3/1989 | Tenenbaum et al. | 382/47 |
| 5,070,404 | 12/1991 | Bullock et al. | 358/147 |
| 5,090,029 | 2/1992 | Yamamoto et al. | 375/107 |
| 5,122,873 | 6/1992 | Golin | 358/13 |
| 5,220,425 | 6/1993 | Enari et al. | 358/160 |
| 5,220,621 | 6/1993 | Saitoh | 382/41 |

OTHER PUBLICATIONS

William Reed, "Multiplex Television Transmission System", Dec. 1967, NASA Tech. Brief.

*Primary Examiner*—Wellington Chin
*Assistant Examiner*—Jean B. Corrielus
*Attorney, Agent, or Firm*—Nikaido Marmelstein Murray & Oram LLP

[57] ABSTRACT

A moving image with a plurality of continuous frames is processed by using a plurality of image processing units (5-1 through 5-n), which operate simultaneously. A frame identification designator (4) attaches an identification number cyclically to each frame of the input image signal. A frame identification selector (6) in each image processing unit inputs an image frame selectively based upon the identification number, and transfers the selected frame to a corresponding image processing module. The image processing units (5-1 through 5-n) typically carry out either the same processing on respective image frames, or a plurality of processing to a single frame. An additional processor network (8) may be coupled with the image processing units for high-level processing including recognition and/or understanding of an image.

10 Claims, 7 Drawing Sheets

IMAGE ANALYSIS SYSTEM

This application is a continuation of application Ser. No. 08/021,137 filed Feb. 23, 1993, and now abandoned.

FIELD OF THE INVENTION

The present invention relates to an image analysis system for processing and/or analyzing an image which is provided through image input devices such as a scanner, a video camera, a video tape recorder, and so on. The present system may further understand the content or meaning of an image through high level processing.

BACKGROUND OF THE INVENTION

Conventionally, an input image provided through image input devices such as a scanner, a video camera, and so on is firstly converted from analog form to digital through an analog-to-digital converter, then processed, analyzed, or understood by using a digital computer and/or a digital circuit.

FIG. 6 shows a typical prior art (Page 194, FIG. 1B "Special computer architectures for pattern processing, CRC Press, Inc. 1982). In the figures, the numeral 1 is an image input unit, 3 is a digital computer, 20 is a frame memory, and 99 is an image signal input terminal. The image input unit 1 carries out the analog-to-digital conversion for an input image signal applied to the input terminal 99. A frame of an image signal in digital form thus converted is stored in the frame memory 20. The computer 3 carries out the processing for the digital images stored in the frame memory 20 by using a computer program stored in the computer 3.

FIG. 7 shows another prior art (Page 7 FIG. 1.6, "Digital image processing, Addison-Wesley Publishing Company, Inc. 1977). In the figure, the numeral 21 is an image processing circuit, 22 is a connection interface. An image signal has voluminous information, as it is an information having a spatial extension, and in case of a moving picture, it has a time extension (for instance 30 frames in each second). When an image signal is processed by using a general purpose computer, it takes a long time for the processing, although the general purpose computer has the flexibility for the content of the processing which is described by software of a computer program. In order to solve this problem, a special LSI (large scale integrated circuit), and/or a special processing circuit has been developed for carrying out a fundamental operation in image processing. The image processing circuit 21 has such a special LSI and/or a special processing circuit. Some examples of the fundamental processing are a point operation, a neighboring operation by using 3×3 pixels (for instance, accumulation of products), and a fast Fourier transform. The fundamental processing directly handles a value of each pixel, but does not understand the content of the image. The connection interface 22 couples the computer 3 with the image processing circuit 21 so that the computer 3 controls the operation of the image processing circuit 21, and/or receives the result of the processing.

The prior art of FIGS. 6 and 7 process an input signal sequentially in the order of an input of image frames. In other words, after the processing for a frame is finished, the processing for a succeeding image frame is carried out. Even when a plurality of image processing circuits and/or calculators are used for high speed processing, image frames are spacially divided and each frame is processed by each image processing circuit, and/or a plurality of pixels are processed simultaneously. Therefore, the processing is carried out in the order of frames in the sequence of arrival. When a set of parameters for a processing is changed, the processing for each set of parameters must be carried out for each set of parameters.

Therefore, a prior image processing system is not flexible, and it is slow in processing operation.

In the case of FIG. 6 which uses a general purpose computer and describes the content of processing by computer program, it may carry out both a simple image processing and a complex image processing, it has the disadvantages that the processing speed is slow and it is almost impossible to process a moving image like a television signal on a real time basis.

In the case of FIG. 7, the high speed processing may be possible if a special circuit matches with the processing. However, as a special circuit is limited to only a fundamental processing, when a high-level processing including analysis and/or understanding of an image is intended, we must use a general purpose computer. If we use a DMA (direct memory access), or GPIB for an interface with a computer to transmit image data, it takes a long time at the interface portion.

SUMMARY OF THE INVENTION

It is an object, therefore, of the present invention to overcome the disadvantages and limitations of a prior image processing system by providing a new and improved image processing system.

It is also an object of the present invention to provide an image processing system having a plurality of image processing units which operate simultaneously for high speed processing by properly distributing input images to those image processing units and controlling processing content in each image processing units.

It is also an object of the present invention to provide an image processing system which handles both a simple fundamental processing, and a complex high-level processing.

The above and other objects are attained by an image processing system comprising; an input terminal for accepting image signal in analog form; an image input unit coupled with the input terminal for analog-to-digital conversion for the image signal; a frame identification designator coupled with the image input unit for supplying frame identification to each image frame at an output of the image input unit; a plurality of image processing units coupled with the frame identification designator, for receiving an image frame which has a specified identification; a control device coupled with the image processing units for controlling each image processing unit; each of the image processing units comprising; a frame identification selector for taking an image frame selectively so that a specific image frame having a frame identification equal to the identification of the frame identification selector is taken; an image processing module for carrying out image processing for an image frame taking by the frame identification selector.

BRIEF DESCRIPTION OF THE DRAWINGS

The foregoing and other objects, features, and attendant advantages of the present invention will be appreciated as the same become better understood by means of the following description and accompanying drawings wherein.

DESCRIPTION OF THE PREFERRED EMBODIMENTS

Figure 1:
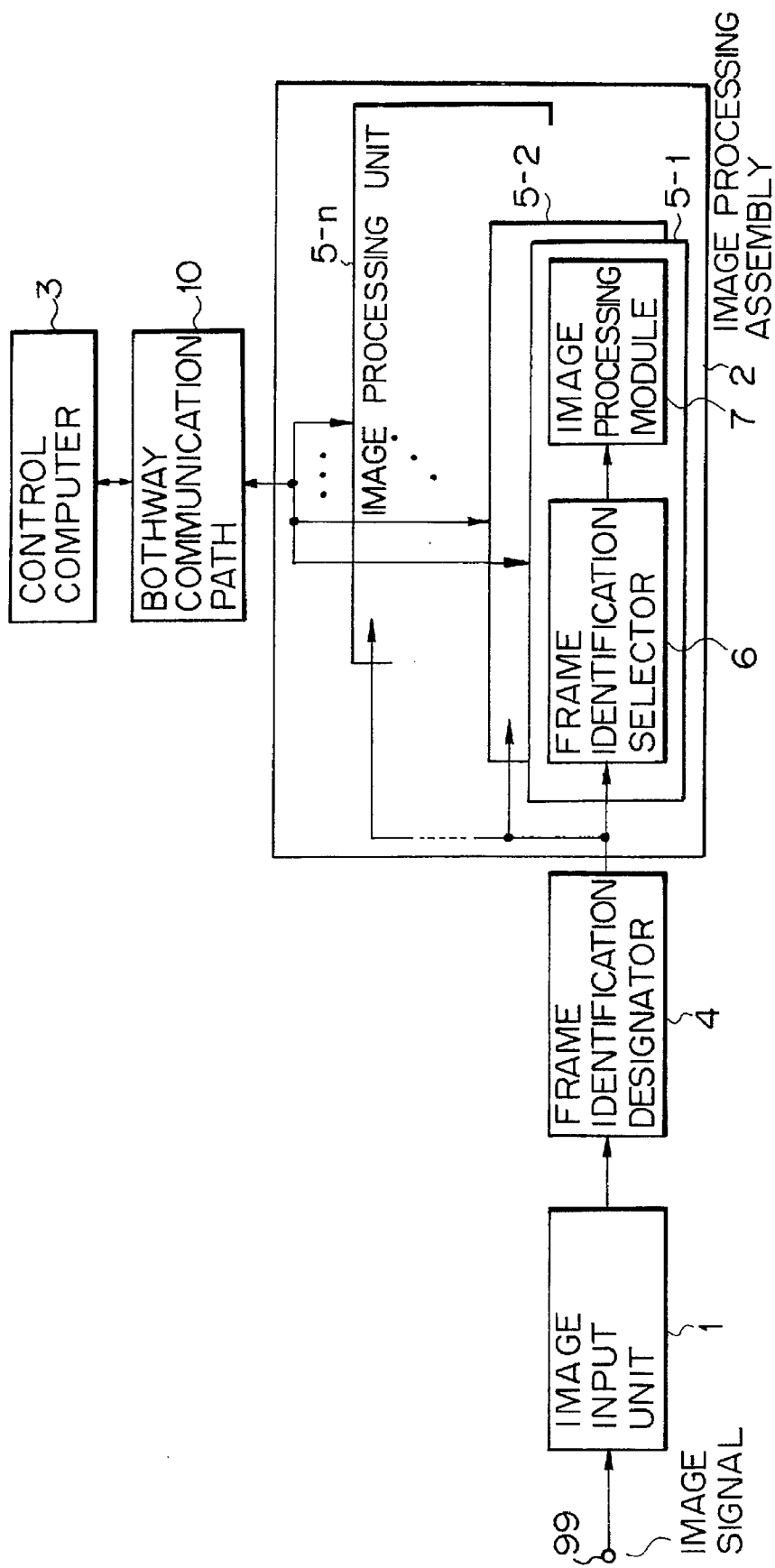
FIG. 1 is a block diagram of an image processing system according to the present invention.

FIG. 1 shows a block diagram of an image analysis system according to the present invention. In the figure, the numeral 1 is an image input unit, 2 is an image processing assembly which has a plurality of image processing units, 3 is a control computer, 4 is a frame identification designator, 5 (5-1 - - - 5-n) is an image processing unit, which has a frame identification selector 6 and an image processing module 7, 10 is a bothway communication path, and 99 is an image input terminal. An image signal applied to the image input unit 1 through the input terminal 99 may be a moving picture supplied by a television camera or a VTR (video tape recorder), and/or a still picture supplied by an image scanner.

The image input unit 1 carries out A/D conversion (analog-to-digital conversion) together with quantization for an image signal in analog form applied to an input terminal 99, and provides an output image signal in digital form. When an input image signal is an interlace type, it may be converted to a non-interlace type signal by combining two field pictures into one frame picture.

The frame identification designator 4 provides a frame identification to each image frame. A frame identification is an integer number from 1 to N, where N is a predetermined integer, for instance N=30. A frame identification increments one by one, and when it reaches N, next frame identification returns to 1. Therefore, a frame identification has a period of N. The upper limit N of the frame identification is supplied by an external circuit (not shown), or by a control computer 3.

The image processing assembly 2 carries out the actual processing for an input digital image signal under the control of the control computer 3, which controls the operation of the image processing assembly 2 and receives the result of the processing. The control computer 3 may be an ordinary personal computer, a work station, or a board type computer. The image processing assembly 2 is coupled with the control computer 3 through the bothway communication path 10 for exchanging program and a data.

The image processing assembly 2 has a plurality of image processing units 5-1 through 5-n. The value of n may be any integer, as long as they are mounted in the assembly 2. Each unit 5-1 through 5-n may be a separate and different unit, but it would be better that all the units have the same architecture are mounted in a single housing considering the simple structure of hardware and easy control. Each unit comprises a frame identification selector 6 and an image processing module 7.

Figure 2:
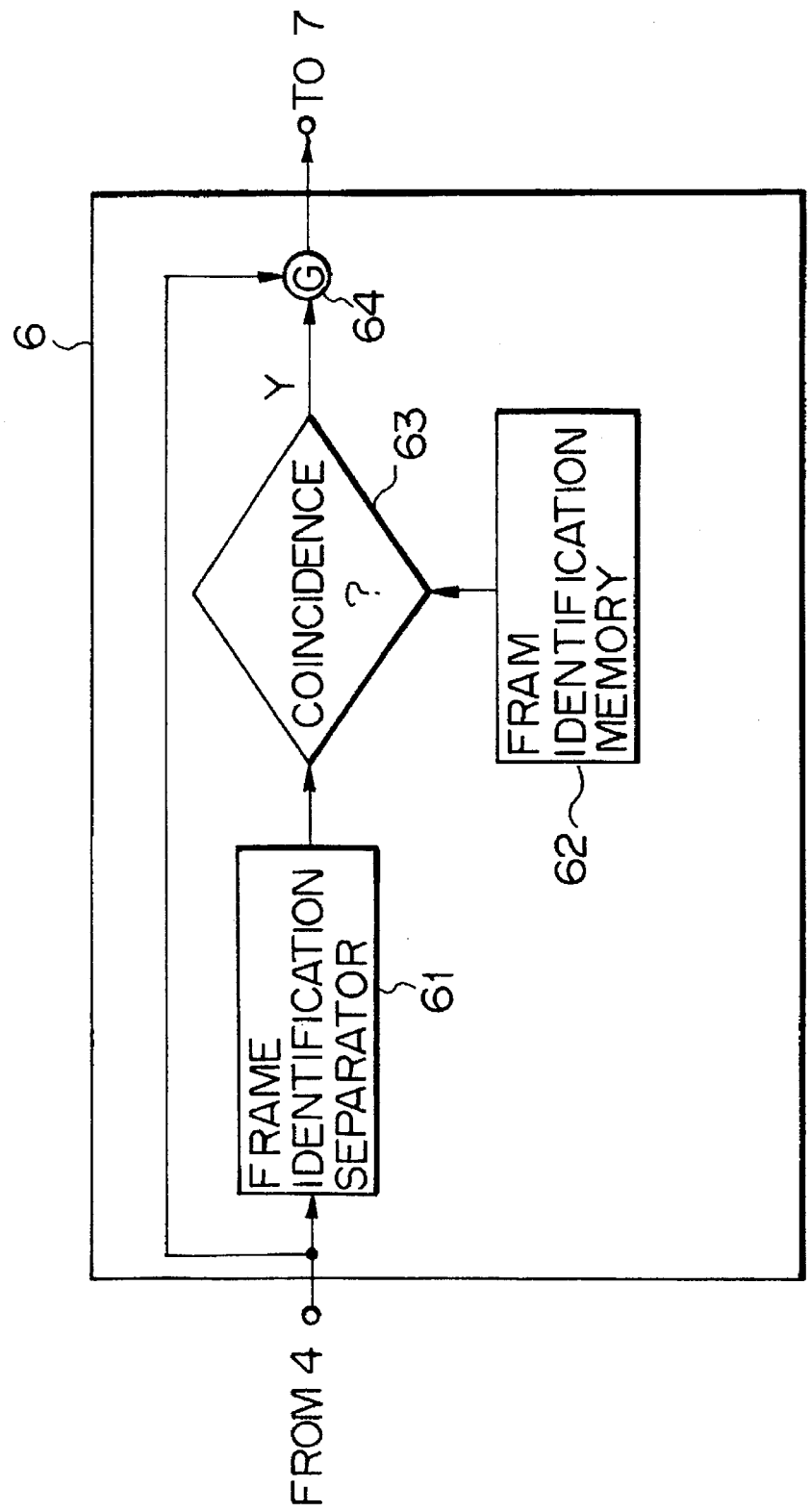
FIG. 2 is a block diagram of a frame identification selector in FIG. 1.

FIG. 2 shows a block diagram of a frame identification selector 6. In the figure, the numeral 61 is a frame identification separator, 62 is a frame identification memory, 63 is a coincidence circuit, and 64 is a gate circuit. The frame identification separator 61 functions to takes a frame identification out of the header portion of an image frame which is forwarded from the image input unit 1 through the frame identification designator 4. The frame identification memory 62 stores a tag which designates each image processing board so that it processes an image frame having a frame identification equal to the tag. The content of the frame identification memory 62 may be set by an external switch (not shown), or it may store a set of tags beforehand. The coincidence circuit 63 compares the frame identification separated by the separator 61 out of the image frame with the tag which is supplied by the memory 62. When the frame identification coincides with the tag, the coincidence circuit 63 opens the gate circuit 64 so that the image frame is forwarded to the image processing module 7, and when the frame identification does not coincides with the tag, the gate 64 is closed so that the related frame is not forwarded to the image processing module 7.

Figure 3:
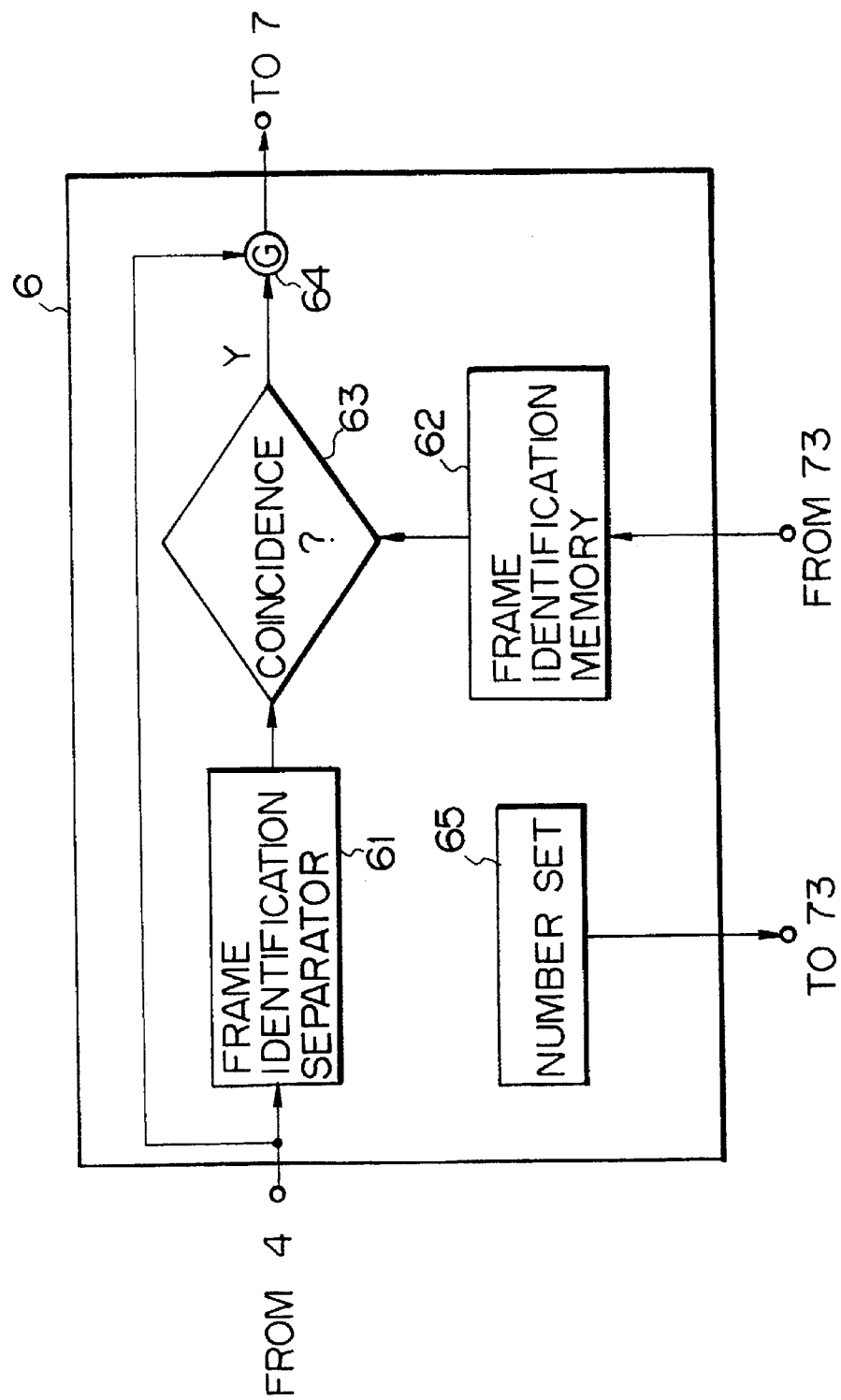
FIG. 3 is another block diagram of a frame identication selector in FIG. 1.

FIG. 3 shows a block diagram of another embodiment of a frame identification selector 6. The feature of FIG. 3 is the presence of a number set 65, and other portions of FIG. 3 are essentially the same as those of FIG. 2. The number set 65 and the frame identification memory 62 in FIG. 3 are coupled with a local control 73 which is described later. The number set 65 determines a specific number to each image processing unit, for instance, when n number of units are provided, each of them is numbered from 1 to n, respectively. The number determined by the number set 65 is forwarded to the local control 73. The local control 73 determines a specific tag based on the number provided in the number set 65, depending upon content of processing, then the local control 73 provides it to frame identification selector 6. The tags provided by the local control 73 are stored in the frame identification memory 62.

Figure 4:
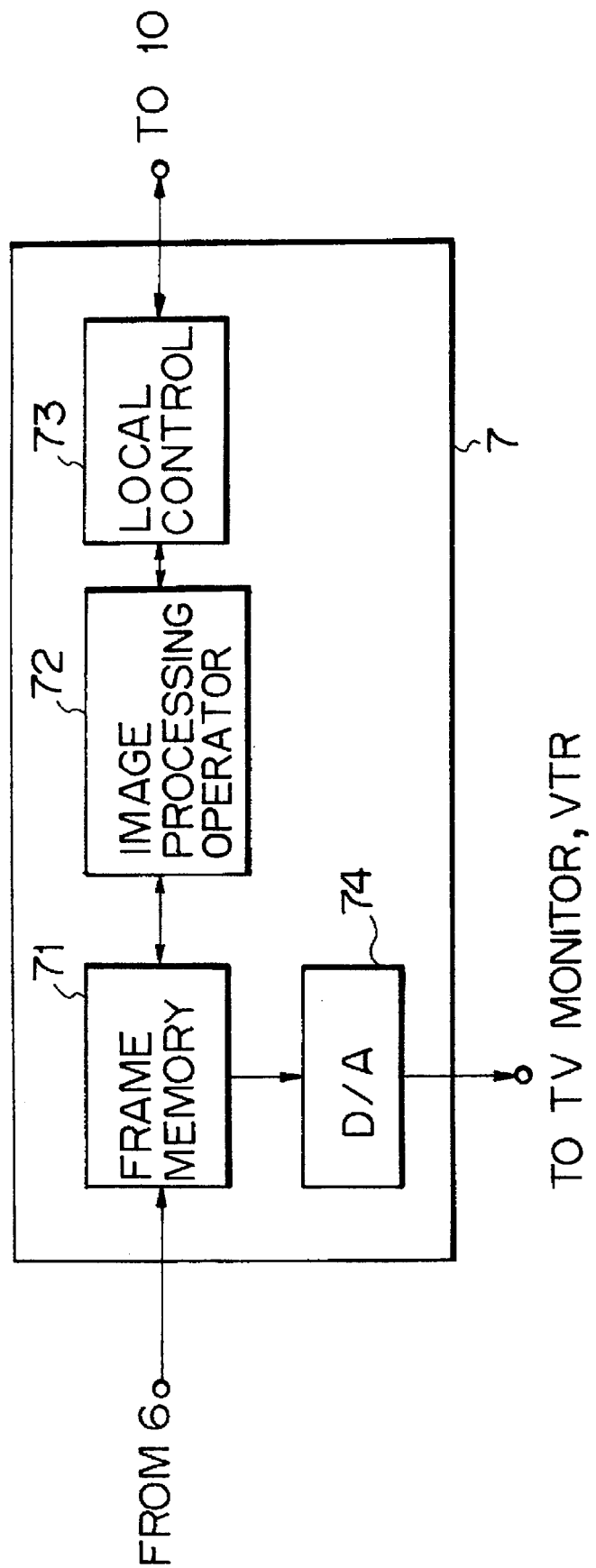
FIG. 4 is a block diagram of an image processing module in FIG. 1.

FIG. 4 shows a block diagram of the image processing module 7, which actually processes an image frame. In the figure, the numeral 71 is a frame memory, 72 is an image processing operator or a processor, 73 is a local control, and 74 is a digital-to-analog converter (D/A). The frame memory 71 stores a frame of input image supplied through the frame identification selector 6 until the predetermined processing in the image processing operator 72 for the current frame finishes, and the memory stores the result of the processing in the operator 72. The image processing operator 72 carried out a predetermined processing for a frame of image stored in the frame memory 71. The local control 73 is coupled with the image processing operator 72 and the control computer 3 through the bothway communication path 10, and functions to determine the contact of processing and the processing mode in the operator 72, and transfer the result of the processing to the control computer 3, under the control of the control computer 3. The local control 73 also functions to determine an address of an image processing unit by providing a tag to the image processing unit. The D/A converter 74 converts a content of the frame memory 71 to an analog form, and the converted analog signal is forwarded to an image monitor, or a video tape recorder (not shown). The D/A converter 74 may be omitted if only parameters of the processing result are requested but no frame of image is necessary, although it is essential if the processing result is visually monitored.

The image processing operator 72 may be an LSI or a specific calculation circuit which is commercially available for low-level processing in pixel levels for image processing purposes. A typical image processing LSI, which is commercially available, "HRU-TAICHI-CORE" provided by Ezel-Sharp-Semiconductor Corporation, Japan. The low-level processing is defined here to be simple systematic processing which does not consider the meaning and/or the content of an image, for instance, the low-level processing includes gray-level conversion, edge detection, filtering (low pass filter process), and thinning operation. These low-level processings are carried out by a conventional image processing circuit 21 in FIG. 7, and a block of pixels (for instance, 3×3 pixels) are processed for above low-level processings. A high-level processing which includes recognition and/or understanding of an image is of course possible in the present invention, and that high-level processing is described later.

The image processing units in FIG. 1 operate independently from one another. In one modification, each processing units may operate so that a processing result of a first processing unit is supplied to another processing unit by coupling image processing operators and/or local controls with each other.

In FIG. 1, where a plurality of image processing units are provided, the operation is as follows. Each image processing unit is determined which frame identification number the image processing unit processes, and the content of the processing by each image processing module is determined.

When only one image processing module is provided, the processing is carried out for each frame sequentially.

When a plurality of image processing modules are provided, the operation is as follows.

First, when all the image processing units take the same frame as one another, each frame is applied to all the image process units at the same time. Therefore, if the content of the processing, and/or the parameters of the processing depend upon each image processing unit, each frame is processed for a plurality of processing contents simultaneously.

Secondly, when each image processing unit takes a different frame, for instance, a first unit takes a first frame, a second unit takes a second frame, et al, a plurality of frames are processed concurrently in a plurality of image processing units. In that case, the processing speed is n times as that when only one image processing unit is used, where n is number of image processing units. In that case, each image processing unit begins the processing when the related frame reaches the unit, therefore, the image processing units do not operate at the same time for a plurality of frames. The result of the processing is obtained sequentially in the order of the input of the frame identification.

Alternatively, n number of image processing modules are grouped into a plurality of groups, so that the content of the processing and/or the parameters of the processing depend upon each group. The frame to be processed in each group may be the same as each other, or different from each other.

As described above, according to the present invention, a frame to be processed in an image processing module, and/or content to be processed may be designed flexibly. Therefore, the change of processing content does not need the change of hardware structure. Further, the processing speed is improved through simultaneous operation of a plurality of image processing units.

Another embodiment of the present invention which carries out both low-level processing and high-level processing is described.

Figure 5:
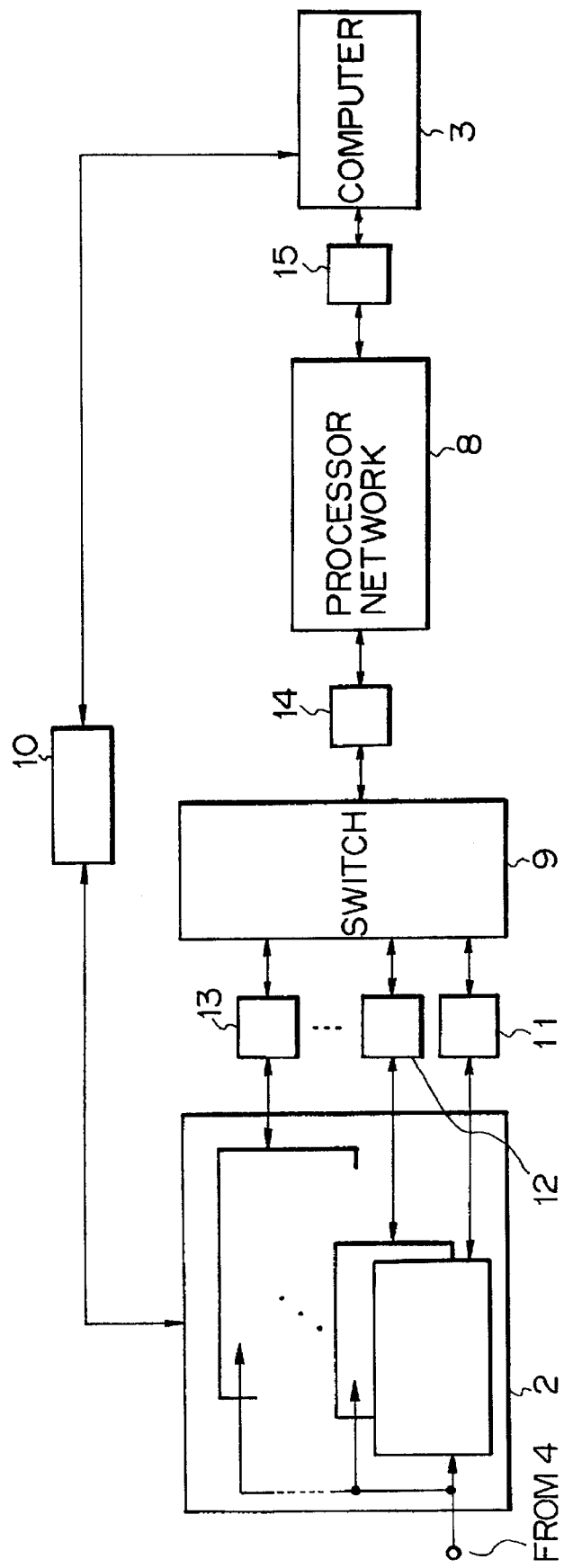
FIG. 5 is a block diagram of another embodiment of the image processing system according to the present invention.
Figure 6:
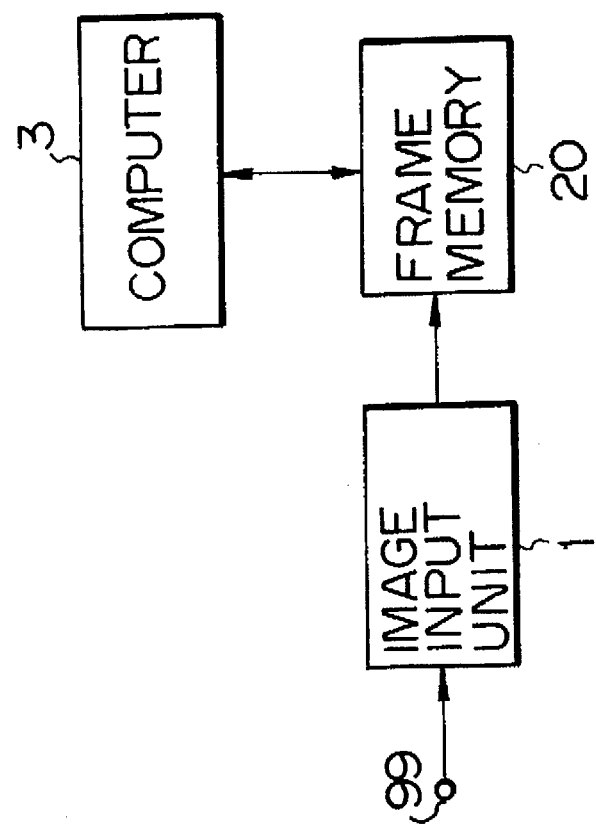
FIG. 6 is a block diagram of a prior art of an image processing system.

FIG. 5 shows a block diagram of another embodiment of the present invention. In the figure, the numeral 8 is a processor network, 9 is a switch, 11 through 15 are a bothway communication path. A local control 73 in an image processing module 7 in an image processing unit 2 is coupled with a computer 3 through a bothway communication path 10, and also coupled with a switch 9 through bothway communication paths 11–13. The switch 9 is coupled with the processor network 8 through a bothway communication path 14. The processor network 8 is coupled with the computer 3 through a bothway communication path 15. It is supposed that bothway communication paths 11–13, 14, and 15 are a specific bus, which has enough communication ability with high bit rate. Alternatively, some of bothway communication paths are substituted with a communication function installed in a special processor described later.

The processor network 8 comprises a plurality of processor groups, each of which has at least one processor. Each processor may be a commercially available microprocessor, or a digital signal processor (DSP) as far as it has digital calculation function and external communication/control function. Preferably, operational program of a processor in the processor network 8 is supplied by the computer 3 through download operation in view of the flexibility. When the download of a program by the computer 3 is impossible, each processor in the processor network 8 has a ROM (read only memory), which stores the program for operating the processor. The processors are coupled with one another in a network so that the communication between the processors is possible. The INMOS transputer (T-800) manufactured by SGS-Thomson Electronics Co,. in France is, for instance, used as a processor and a local control 73 in the processor network 8, since it has a communication function called a link.

Some embodiments are possible for providing a network which has a plurality of processors. Some of them are a pipe line system, and a hierarchical structured system. These structures are conventional, and the inner structure of a network is also conventional.

The switch 9 connects selectively the bothway communication paths 11–13 which are coupled with the image processing units 5-1 through 5-n, with the bothway communication path 14 which is coupled with the processor network 8. In a simple case, the switch 9 connects each image processing unit to each processor in the processor network 8 on the one-by-one basis with the fixed relations. In general, the switch 9 functions to connect flexibly the image processing units to the processor network depending upon the number of image processing units, and the number of processors in the processor network, and the object of the processing.

The embodiment of FIG. 5 has the feature that a plurality of image processing units 5-1 through 5-n in the embodiment of FIG. 1 are coupled with the processor network 8 through the bothway communication paths 11–13, and 14, and the switch 9. This structure enables the high-level processing of an image.

An image processing operator 72 in FIG. 4 provides a pixel level processing to an input image frame. This processing is a so-called low-level processing, which is a basis for extracting a feature in an image frame, and/or measuring an image frame. On the other hand, the processor network 8 carries out a high-level processing including recognition and/or understanding of an image frame to the processing result of the image processing units 5-1 through 5-n. The content of a high-level processing may be designed by a computer program installed on each processor. As the processor network 8 is coupled with the image processing units 5-1 through 5-n through the bothway communication paths 11—14 and the switch 9, the processing result in the image processing units may be forwarded directly to the processor network 8, thus, the efficiency of a high-level processing is improved. The flow of information is not restricted from the image processing units to the processor network, but also the opposite direction is possible. Therefore, it is possible to modify a processing algorithms and/or a set of processing parameters for an input image frame, depending upon a processing result of high-level processing in the processor network 8.

Figure 7:
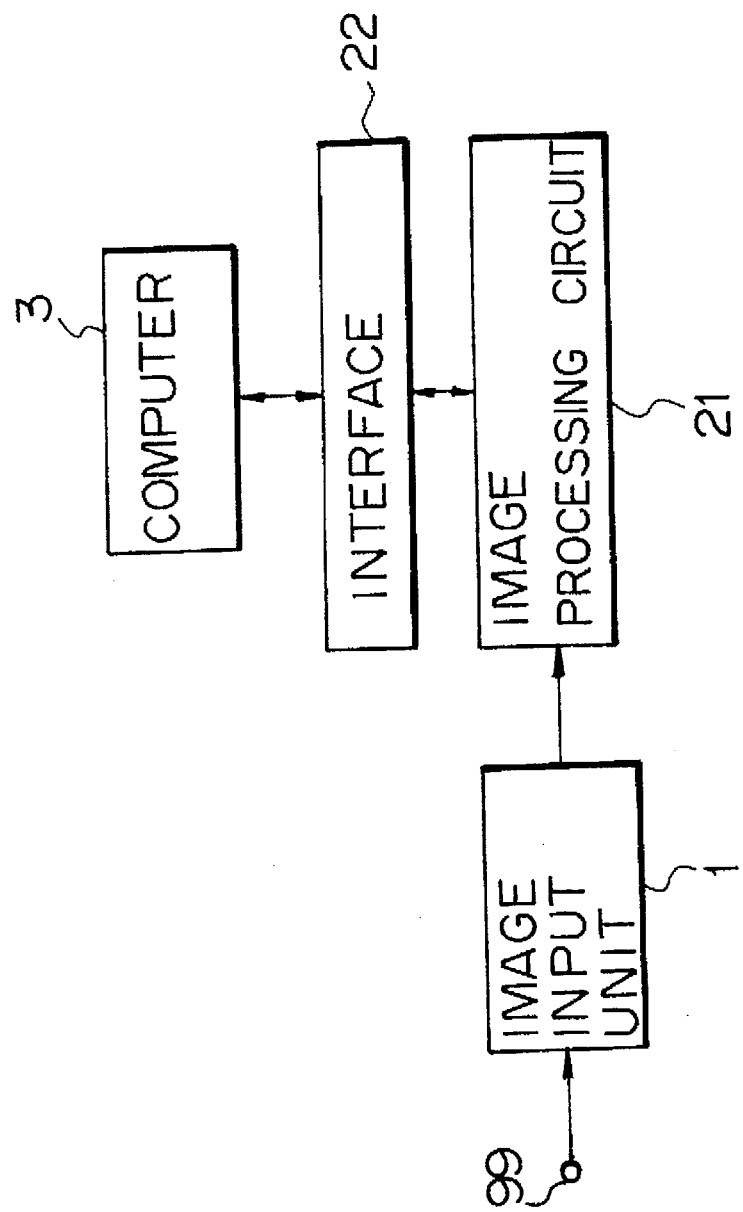
FIG. 7 is a block diagram of another prior art of an image processing system.

It should be appreciated that a high-level image processing has been carried out in a prior art by using a general purpose computer, which is coupled with a low-level image processing circuit as shown in FIG. 7. In that structure, a general purpose computer is independent from an image processing circuit, and therefore, the coupling is not dense, and the total processing including both a low-level processing and a high-level processing has been difficult. On the other hand, the embodiment of FIG. 5 carries out both a low-level processing and a high-level processing, keeping the flexibility of operation by using computer software.

As described above, the present invention has a feature having a plurality of image processing units, which process either a plurality of input image frames concurrently, or a plurality of processing items for a single input image frame. Thus, the total processing speed is improved. Further, the embodiment of FIG. 5 has a processor network 8 for a high-level processing, and an image processing assembly 2 for a low-level processing, and means for directly coupling the former with the latter with high bit rate communication path, so that not only a low-level processing but also a high-level processing which includes recognition and/or understanding of an image are carried out with high efficiency.

The present invention is applicable to an image analysis system in the field which needs image processing and/or image recognition, including image communication field, industry field, and medical field.

From the foregoing it will now been apparent that a new and improved image processing system has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. An image analysis system comprising:
   an input terminal for accepting an image signal in analog form;
   an image input unit connected to said input terminal for analog-to-digital conversion for said image signal;
   a frame identification designator connected to said image input unit for supplying frame identification to each image frame at an output of said image input unit;
   a plurality of image processing units connected to said frame identification designator, each image processing unit having a capability to process an image frame which has a specific frame identification determined in each image processing unit, and said plurality of image processing units operating in one of three modes of operation consisting of a) concurrently processing the same image frame with different processing contents, b) sequentially inputting each of the input image frames and processing in a same manner and c) a mixture of concurrently and sequentially processing image frames; and
   a control means connected to said image processing units for controlling each image processing unit,
   each of said image processing units includes
      a frame identification selector for selecting said image frame selectively so that a specific image frame, having a frame identification equal to an identification determined in each image processing unit, is selected, and
      an image processing module for carrying out image analysis for said image frame selected by said frame identification selector.

2. An image analysis system according to claim 1, wherein each of said image processing units has a local control which controls operation of said frame identification selector and said image processing module in said image processing unit, and controls information transfer from and to said control means.

3. An image analysis system according to claim 1, wherein said frame identification selector includes has a number set, and coincidence means for comparing said frame identification of an input image frame with a number input by said number set, so that an image frame having the same frame identification as the number input by the number set is input into the image processing unit.

4. An image analysis system according to claim 1, wherein two way communication means is provided for transferring information between local controllers of image processing units.

5. An image analysis system according to claim 1, further comprising a processor network having a) a plurality of network processor groups coupled with one another, b) a first two way communication means coupling each network processor in said network processor groups with local controllers in said image processing units, and c) a second two way communication means coupling said processor network with said control means coupled with said image processing units.

6. An image analysis system according to claim 5, wherein each network processor group in said processor network for operating with a computer program which is supplied by said control means, and for exchanging processing results and parameters with other network processor groups within the processor network.

7. An image analysis system according to claim 5, wherein said processor network carries out image processing including image recognition.

8. An image analysis system according to claim 1, wherein each of said image processing units has a number set which specifies a mutually different number to identify each image processing unit, local controllers of each image processing unit calculates a second frame identification based on the number specified by said number set, and coincidence means for comparing said frame identification of an input image frame with said second frame identification calculated by said local controller, so that an image frame having the frame identification the same as the second frame identification calculated by said local controller is processed by the image processing unit.

9. An image analysis system according to claim 1, wherein said image analysis is a pixel level processing which is a basis for extracting a feature in said image frame.

10. An image analysis system comprising:
   an input terminal for accepting an image signal in analog form;
   an image input unit connected to said input terminal for analog-to-digital conversion for said image signal;
   a frame identification designator connected to said image input unit for supplying frame identification to each image frame at an output of said image input unit;

a plurality of image processing units connected to said frame identification designator, each image processing unit having a capability to process an image frame which has a specific frame identification determined in each image processing unit, and said plurality of image processing units operating in one of three modes of operation consisting of a) each of the image processing units concurrently inputting the same image frame and each image processing unit processing the image frame differently from one another, b) each of the image processing units sequentially inputting a different one of input image frames and each image processing unit processing the input image frame in a same manner and c) the plurality of image processing units are grouped into a plurality of groups and image frames processed in each group are a mixture of concurrently and sequentially processed as described in a) and b); and a control means connected to said image processing units for controlling each image processing unit, each of said image processing units includes a frame identification selector for selecting said image frame selectively so that a specific image frame, having a frame identification equal to an identification determined in each image processing unit, is selected, and an image processing module for carrying out image analysis for said image frame selected by said frame identification selector.

* * * * *